(No Model.) 2 Sheets—Sheet 1.
W. DUNBAR & J. R. KINLEY.
HAND CAR.
No. 298,736. Patented May 20, 1884.
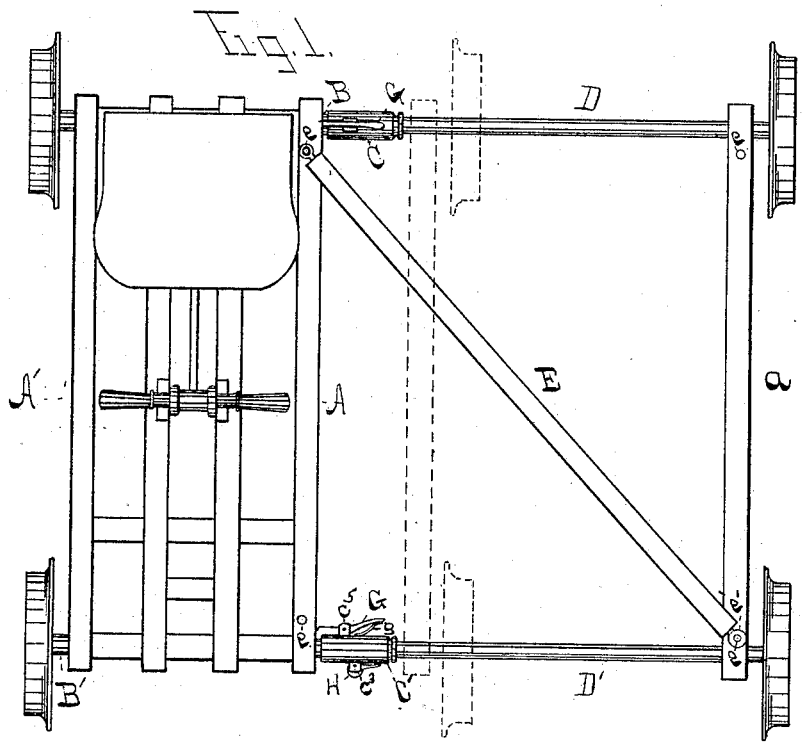
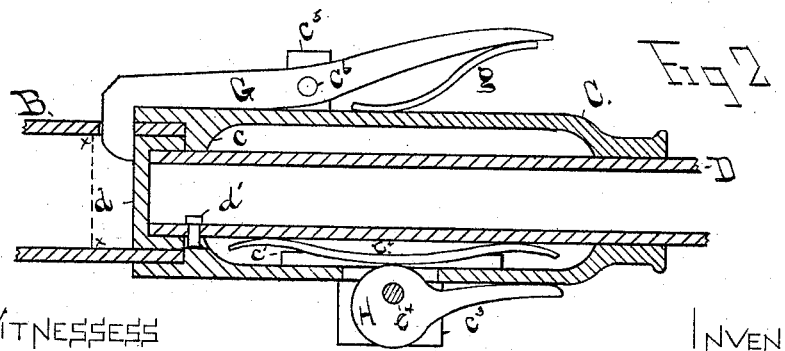

(No Model.) 2 Sheets—Sheet 2.

W. DUNBAR & J. R. KINLEY.
HAND CAR.

No. 298,736. Patented May 20, 1884.

WITNESSES:
E. L. Thurston
E. E. Schafer

INVENTORS:
Warren Dunbar
Joseph R. Kinley
by Hill & Dixon
their Attorneys

UNITED STATES PATENT OFFICE.

WARREN DUNBAR, OF MINNEAPOLIS, MINNESOTA, AND JOSEPH R. KINLEY, OF CHICAGO, ILLINOIS.

HAND-CAR.

SPECIFICATION forming part of Letters Patent No. 298,736, dated May 20, 1884.

Application filed February 23, 1884. (No model.)

*To all whom it may concern:*

Be it known that we, WARREN DUNBAR, of the city of Minneapolis, Hennepin county, and State of Minnesota, and JOSEPH R. KINLEY, of the city of Chicago, Cook county, and State of Illinois, have invented certain new and useful Improvements in Hand-Cars, of which the following is a description, reference being had to the accompanying drawings, in which—

Figure 3:
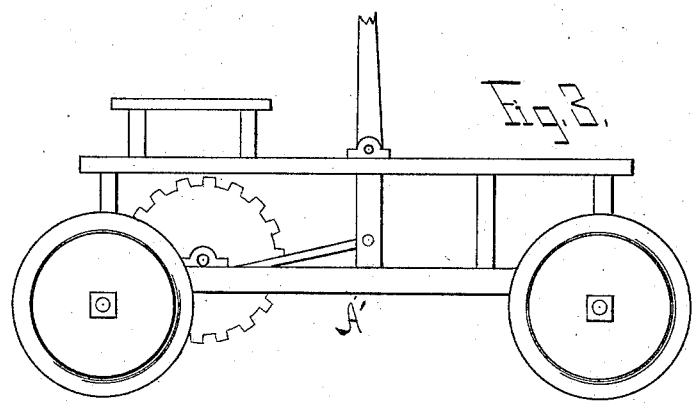
Figure 4:
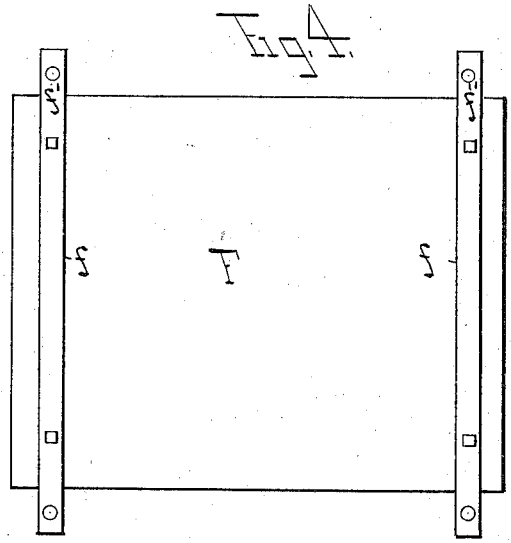

Figure 1 is a top view of our improved hand-car. Fig. 2 is a detailed cross-section of the connection between the two parts of the axles. Fig. 3 is a side elevation of our hand-car; and Fig. 4 is an under view of the box hereinafter described.

One of the objections to hand-cars as at present constructed is that they are so large and of such shape as to be very troublesome to handle. If after using one at one point on the road it is desired to transport it to another point at some distance, much difficulty is experienced in getting it from the track and into the transporting-car, as the ordinary hand-car is too large to go into a baggage or freight car door without being tipped on end.

The object of our invention is to overcome these difficulties and to provide a hand-car or truck for use on railways which, while capable of all the ordinary uses to which a hand-car is put, can be readily contracted in size, and thereby made more easy to handle in putting it on or taking it from the track, and which, when so contracted, will pass freely into a car-door and occupy a comparatively small space when in transit—in a word, to provide a portable hand-car which shall always be ready for instant use.

To this end our invention consists in providing a hand-car with axles in two parts, one part, suitably journaled to the main frame of the hand-car, being hollow, with the orifice of such dimensions as to permit the other part, which is suitably journaled to a supplemental frame, to telescope within said hollow part, and means for connecting said parts and retaining them in the desired positions, all of which will be hereinafter more fully described, and definitely pointed out in the claims.

In the drawings, A A' are the side bars of the main hand-car frame. To these are fixed suitable bearings, in which the axles B B' revolve.

B B' are the hollow parts of the axles, and D D' the telescoping parts. These axles D D' revolve in suitable bearings fixed to the supplemental frame-piece $a$.

C C' are collars which extend over and are rigidly fixed to the axles B B'. On one side of each of these collars are fixed the lugs $c^5$, in which is fastened the pin $c^6$. On this pin plays the retaining-lever G, which is given a constant tendency to assume the position shown in Fig. 2 by the spring $g$. On the other side of the collar C are the lugs $c^3$, in which is fixed the pin $c^4$. Upon this pin revolves the eccentric friction-clamp H in contact with the spring $c^2$. This spring is retained in position by two interior ribs, $c'$, on the collar.

$d$ is a flange-collar fixed to the end of the axle D.

When it is desired to take the car from the track, the spring $g$ is compressed, which throws the other end of the lever G out from behind the rear end of the cap $d$. The axles D D' may now be pushed within the axles B B' until the parts assume the position shown by the dotted lines in Fig. 1. The friction-clamp H is revolved, and a pressure thereby applied to the spring $c^2$. This pressure holds the parts sufficiently firm to enable one to handle the car easily with the parts thus compressed. The same effect can be accomplished as is secured by the clamp H and spring by providing each of the axles D D' with depressions or recesses, into which the bent end of the retaining-lever G can enter.

When it is desired to prepare the car for use upon the track, the pressure of the clamp H is relaxed and the axles D D' can be drawn from their position within the axles B B'. When the two parts of the axle reach the position shown in Fig. 2, the flange-collar $d$ strikes against the interior flange, $c$, on the collar C and prevents further movement in that direction. The spring $g$ then forces the retaining-lever G down behind said flange-collar $d$ and prevents any backward motion. The axles are still further held in this position by one or more braces, E, or their equivalents. In the form illustrated the brace is a wooden bar provided at its ends with iron eyes $e'$. These eyes fit over the pins $e$ on the main and supplemental frame-pieces, and all twisting or distorting movement is prevented.

It is very desirable to provide some means by which the same power which revolves the driving-axle B shall at the same time give a like motion to the axle D, that thereby the full force of the friction of the wheels on both rails may be utilized. The means illustrated in the drawings is as follows: The pin $d'$ is fixed to the axle D. In extending the axles this pin would offer a resistance to the complete extension by striking against the flange $c$. We therefore provide this flange $c$ with a longitudinal groove, which allows the pin to slip into it and the axles be fully extended, when any revolution of the axle D within the axle B is prevented, and whatever power is applied to revolve the axle B will produce a like revolution of the axle D. The same result may be accomplished by prolonging the flange-collar $d$ backward to the dotted line $x\,x$ in Fig. 2 and providing it with a groove or depression, into which the arm of the retaining-lever G can fit; or the two parts may be provided with a tongue and groove, respectively, extending through the entire length.

If it is desired to carry tools or other materials in any considerable quantity, the box F (shown in Fig. 4) may be used. In the form illustrated, this box is provided on its under side with straps $f$, preferably of iron. In the ends thereof are the holes $f'$, so arranged as to fit over the pins $e$, thus securely fixing the box to the truck, while the box also acts as a brace.

This car so constructed is very easily adapted to both broad and narrow gage roads, by providing the axles D D' with notches or depressions into which the end of the retaining-lever G fits at the proper points. The axles can then be pulled out to those points, and the retaining-levers will hold them firmly in place.

These improvements are independent of the means used for propelling the car, and any convenient method may be employed.

Having thus described our invention, what we claim as new, and desire to secure by Letters Patent, is—

1. A hand-car provided with telescoping axles, one part of each axle being suitably journaled to the main hand-car frame, while the other part is suitably journaled to a supplemental frame-work, which moves laterally as the two parts of the axle move the one within the other, substantially as described, and for the purpose of convenience in handling.

2. In a hand-car, the combination of telescoping axles, one part of each axle being journaled to the main hand-car frame, while the other part is journaled to a supplemental frame-work, with retaining devices which hold the two parts in fixed positions, substantially as and for the purposes set forth.

3. In a hand-car provided with telescoping axles and a main and supplemental frame-work, the combination, with the main frame and supplemental frame-work, of a box attached thereto as a brace, substantially as described.

4. In a hand-car provided with telescoping axles and a main and supplemental frame-work, the combination, with the main and supplemental frame-work, of a brace, E, or its equivalent, for the purposes herein set forth.

WARREN DUNBAR.
JOSEPH R. KINLEY.

Witnesses as to signature of Dunbar:
  E. E. SCHAFER,
  J. W. TOUSLEY.
Witnesses as to signature of Kinley:
  E. L. THURSTON,
  T. H. HOOD.